US012602402B2

(12) United States Patent
Pekofsky et al.

(10) Patent No.: US 12,602,402 B2
(45) Date of Patent: Apr. 14, 2026

(54) SYNCHRONOUS PROCESSING SYSTEMS AND METHODS WITH IN-MEMORY DATABASE

(71) Applicant: OPEN TEXT CORPORATION, Waterloo (CA)

(72) Inventors: Gregory Pekofsky, Dollard-des Ormeaux (CA); Jonathan Carroll, Sainte Anne des Lacs (CA)

(73) Assignee: OPEN TEXT CORPORATION, Waterloo (CA)

( * ) Notice: Subject to any disclaimer, the term of this patent is extended or adjusted under 35 U.S.C. 154(b) by 54 days.

(21) Appl. No.: 17/829,039

(22) Filed: May 31, 2022

(65) Prior Publication Data

US 2023/0409600 A1     Dec. 21, 2023

(51) Int. Cl.
*G06F 16/27*          (2019.01)
*G06F 16/23*          (2019.01)
*G06F 16/25*          (2019.01)

(52) U.S. Cl.
CPC ............ *G06F 16/275* (2019.01); *G06F 16/23* (2019.01); *G06F 16/25* (2019.01)

(58) Field of Classification Search
CPC ......... G06F 16/275; G06F 16/23; G06F 16/25
See application file for complete search history.

(56) References Cited

U.S. PATENT DOCUMENTS

| | | | | |
|---|---|---|---|---|
| 10,775,976 | B1 * | 9/2020 | Abdul-Jawad | ............ G06F 9/54 |
| 11,550,812 | B2 * | 1/2023 | Liu | ........................... G06F 9/54 |
| 11,675,816 | B1 * | 6/2023 | Chandrasekharan | ........................ G06F 11/3082 707/737 |
| 2013/0198260 | A1 * | 8/2013 | Dow | ...................... G06F 16/958 709/203 |
| 2015/0310044 | A1 * | 10/2015 | Isaacson | ............... G06F 16/256 707/613 |
| 2016/0147748 | A1 * | 5/2016 | Florendo | ............. G06F 16/2282 707/809 |
| 2020/0042658 | A1 * | 2/2020 | Basin | .................. G06F 16/2228 |
| 2020/0104387 | A1 * | 4/2020 | Sirajuddin | ............ G06F 16/211 |
| 2021/0117868 | A1 * | 4/2021 | Sriharsha | ............... G06N 20/20 |

(Continued)

FOREIGN PATENT DOCUMENTS

| | | | | |
|---|---|---|---|---|
| CN | 102497442 | A | * | 6/2012 |
| JP | 2008310517 | A | * | 12/2008 |

(Continued)

*Primary Examiner* — Mark E Hershley
(74) *Attorney, Agent, or Firm* — Sprinkle IP Law Group

(57) ABSTRACT

An orchestration platform leverages an in-memory database for guaranteed synchronous processing of requests from origin devices. The in-memory database is created on a per-transaction basis and localized to a synchronous orchestration engine, which is a part of an orchestration platform. The in-memory database is serialized and stored in memory. To update the in-memory database, the in-memory database is deserialized and one or more database operations can be performed on the in-memory database. The updated in-memory database is communicated to a return to caller service which deserializes and extracts data from the updated in-memory database. The data is stored in a disk-based database that is accessible by an asynchronous orchestration engine. At this point, the updated in-memory database no longer exists.

20 Claims, 6 Drawing Sheets

(56)  References Cited

U.S. PATENT DOCUMENTS

| | | | | |
|---|---|---|---|---|
| 2021/0297453 A1* | 9/2021 | Crabtree | ............... | G06F 16/951 |
| 2022/0269691 A1* | 8/2022 | Liu | ........................... | G06F 9/54 |
| 2023/0179655 A1* | 6/2023 | Mustafa | .............. | H04L 67/1051 |
| 2023/0409600 A1* | 12/2023 | Pekofsky | .............. | G06F 16/275 |

FOREIGN PATENT DOCUMENTS

| | | | | | |
|---|---|---|---|---|---|
| KR | 20180021679 A | * | 3/2018 | ....... | G06F 17/30371 |
| WO | WO-2011025595 A1 | * | 3/2011 | ........... | G06F 16/254 |
| WO | WO-2020232012 A1 | * | 11/2020 | ......... | G06F 12/0802 |

* cited by examiner

TO FIG. 1B

FROM FIG. 1A

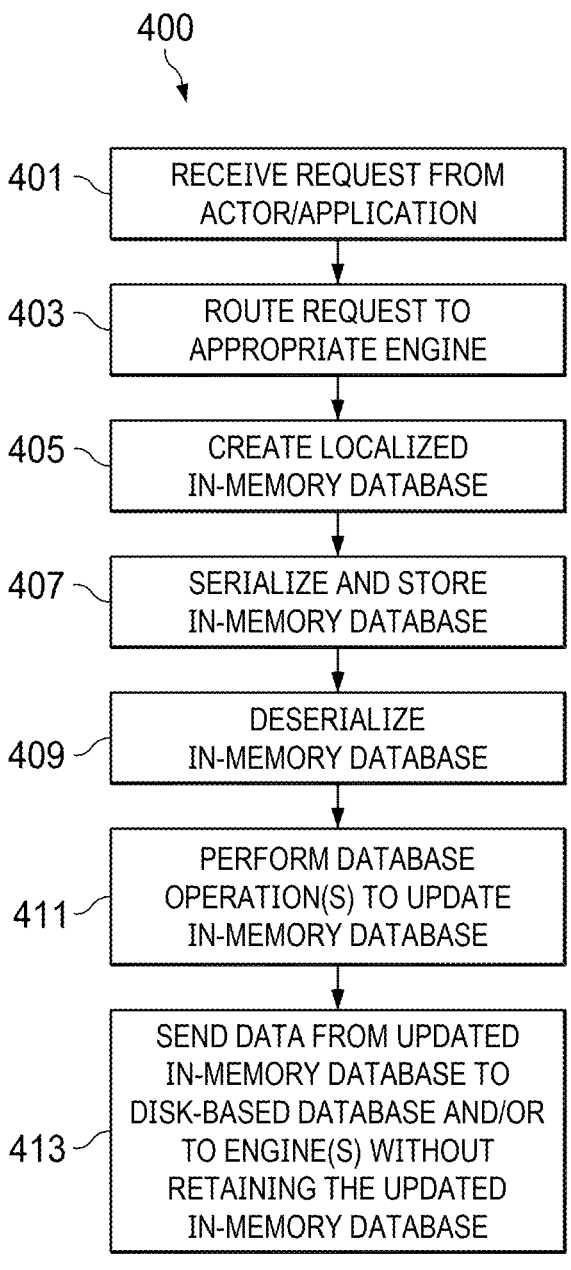

400

401 — RECEIVE REQUEST FROM ACTOR/APPLICATION

403 — ROUTE REQUEST TO APPROPRIATE ENGINE

405 — CREATE LOCALIZED IN-MEMORY DATABASE

407 — SERIALIZE AND STORE IN-MEMORY DATABASE

409 — DESERIALIZE IN-MEMORY DATABASE

411 — PERFORM DATABASE OPERATION(S) TO UPDATE IN-MEMORY DATABASE

413 — SEND DATA FROM UPDATED IN-MEMORY DATABASE TO DISK-BASED DATABASE AND/OR TO ENGINE(S) WITHOUT RETAINING THE UPDATED IN-MEMORY DATABASE

FIG. 4

SYNCHRONOUS PROCESSING SYSTEMS AND METHODS WITH IN-MEMORY DATABASE

TECHNICAL FIELD

This disclosure relates generally to synchronous processing. More particularly, this disclosure relates to synchronous processing systems, methods, and computer program products with an in-memory database for fast and secure orchestration operations.

BACKGROUND OF THE RELATED ART

In computing, orchestration refers to the automated configuration, coordination, and management of computer systems, applications, and/or services. An orchestration platform provides the necessary hardware and software to support automated execution of complex tasks and workflows.

Usually, an orchestration platform may utilize a database to keep track of the creation and progress of every customer flow. For example, a customer of the orchestration platform may send an invoice to a trading partner through an information exchange platform. This customer flow may involve multiple steps. For instance, the invoice may be encrypted and compressed. Therefore, processing the invoice would require decryption and decompression. These are examples of actions that may need to be taken on a file being communicated from the customer to its trading partner for this particular customer flow. The information exchange platform may leverage the orchestration platform to orchestrate such steps, actions, and customer flows.

Because errors may occur at any part of a customer flow, the orchestration platform generally leverages a database to persist processing information and, for auditing purposes, relies heavily on this database with many expensive accesses in order to keep track of what happens throughout every customer flow. For synchronous processing, such heavy database accesses can create latency.

In view of the foregoing, there is a need for innovations and improvements in synchronous processing performed by orchestration platforms. This disclosure addresses this need and more.

SUMMARY OF THE DISCLOSURE

A goal of this disclosure is to enhance an orchestration platform with fast and secure guaranteed synchronous processing of requests from origin devices associated with applications, services, customers, etc. This goal is accomplished with an in-memory database that is created on a per-transaction basis and localized to a synchronous orchestration engine, which is a component of the orchestration platform. In this case, the term "transaction" refers to a customer flow processed through an electronic information exchange platform that leverages the orchestration platform to orchestrate synchronous processing of incoming requests.

Once created, the in-memory database is serialized and stored in memory. To update the in-memory database, the in-memory database is deserialized and a database operation is performed on the in-memory database. The updated in-memory database is communicated to a return to caller service which deserializes and extracts data from the updated in-memory database. At this point, the updated in-memory database is discarded and not kept in memory. The data thus extracted is stored in a disk-based database that is accessible by an asynchronous orchestration engine. The asynchronous orchestration engine may further process the data and update the disk-based database.

More specifically, in some embodiments, an ingress router may receive a request from an origin device. The origin device can be associated with an actor (e.g., an authorized user), an application, or a service. The ingress router may route the request to an appropriate synchronous orchestration engine based on data (e.g., customer metadata) contained in the request. The synchronous orchestration engine can be one of a plurality of synchronous orchestration engines running on the orchestration platform. In response to the request from the origin device, the synchronous orchestration engine may create an in-memory database using data specific to the origin device, the actor, or the application.

In some embodiments, the synchronous orchestration engine may serialize and store the in-memory database in memory. The synchronous orchestration engine may perform (e.g., by calling a synchronous orchestration service) a database operation on the in-memory database. To do so, the in-memory database is deserialized. Examples of database operations may include inserting a row, editing a row, deleting a row, etc. Once the in-memory database is updated, it is serialized again and stored in memory. As alluded to above, the underlying orchestration platform may rely on these database operations to keep track of steps and actions performed through a particular customer flow.

In some embodiments, both the synchronous orchestration engine and the synchronous orchestration service can be part of the orchestration platform which orchestrates processing of incoming requests for an electronic information exchange platform. In some embodiments, the synchronous orchestration service is operable to deserialize the in-memory database, perform a database operation on the in-memory database to produce an updated in-memory database, and serialize the updated in-memory database. The serialization and deserialization steps may occur multiple times throughout the customer flow, depending upon the number of database operations involved in the customer flow.

The synchronous orchestration engine traverses a processing tree corresponding to the customer flow where nodes of the processing tree represent steps of the customer flow. Once the traversal is complete and no more updates to the in-memory database are needed, the synchronous orchestration engine communicates the updated in-memory database to a return to caller service. The return to caller service is operable to deserialize the updated in-memory database, extract data from the updated in-memory database, store the data extracted from the updated in-memory database in a disk-based database, and return a response to the synchronous orchestration engine for responding to the request from the origin device. At this time, the updated in-memory database is no longer needed, so it is not returned to the synchronous orchestration engine or kept in memory. The data stored in the disk-based database is accessible by an asynchronous orchestration engine. The asynchronous orchestration engine may further process the data and update the disk-based database.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. The features illustrated in the drawings are not necessarily drawn to scale.

FIG. 4 is a flow chart that illustrates an example of synchronous processing that leverages an in-memory database according to some embodiments disclosed herein.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1A:
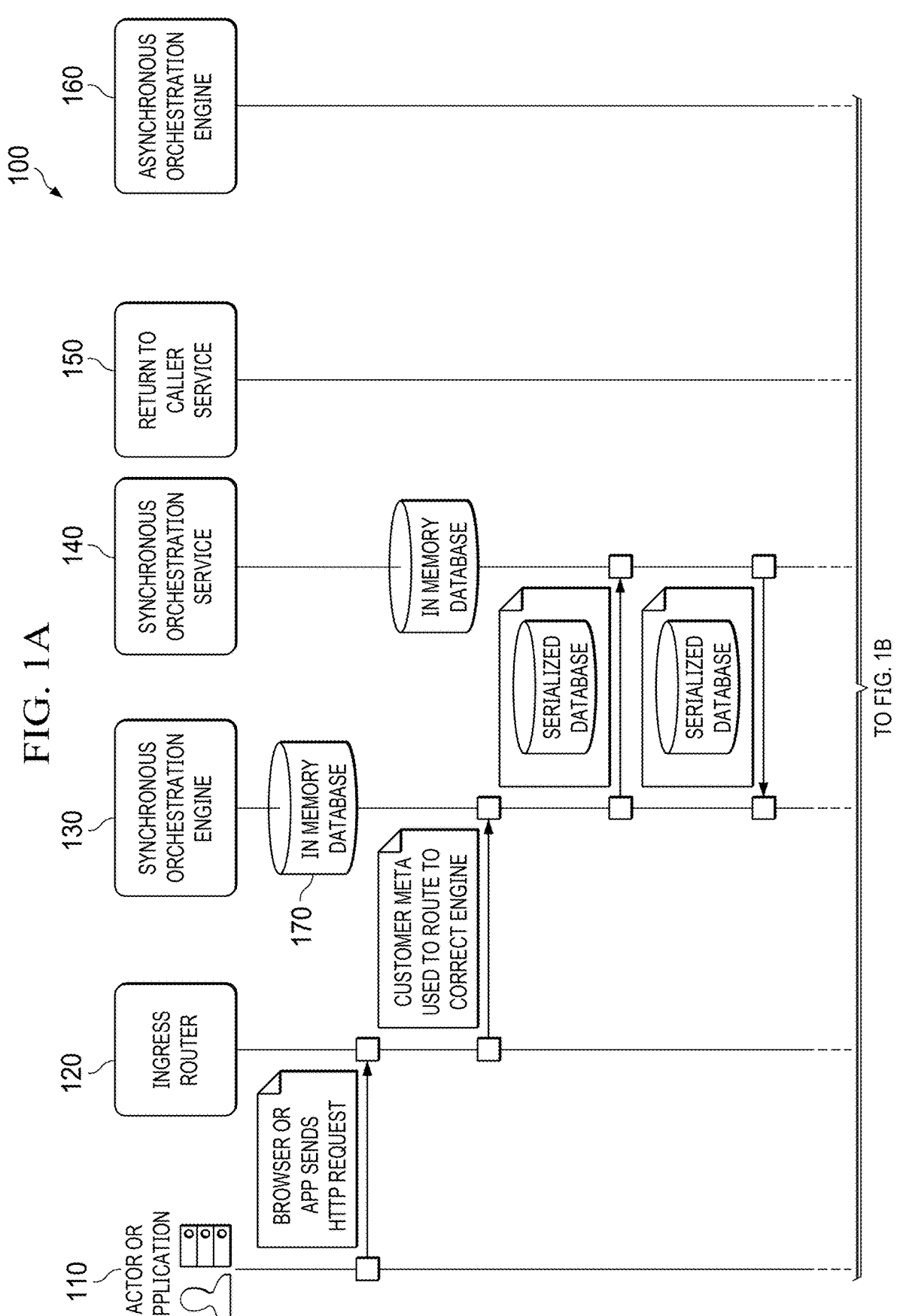
FIGS. 1A-1B together depict an example of synchronous processing of a customer flow by an orchestration platform that leverages an in-memory database according to some embodiments disclosed herein.
Figure 1B:
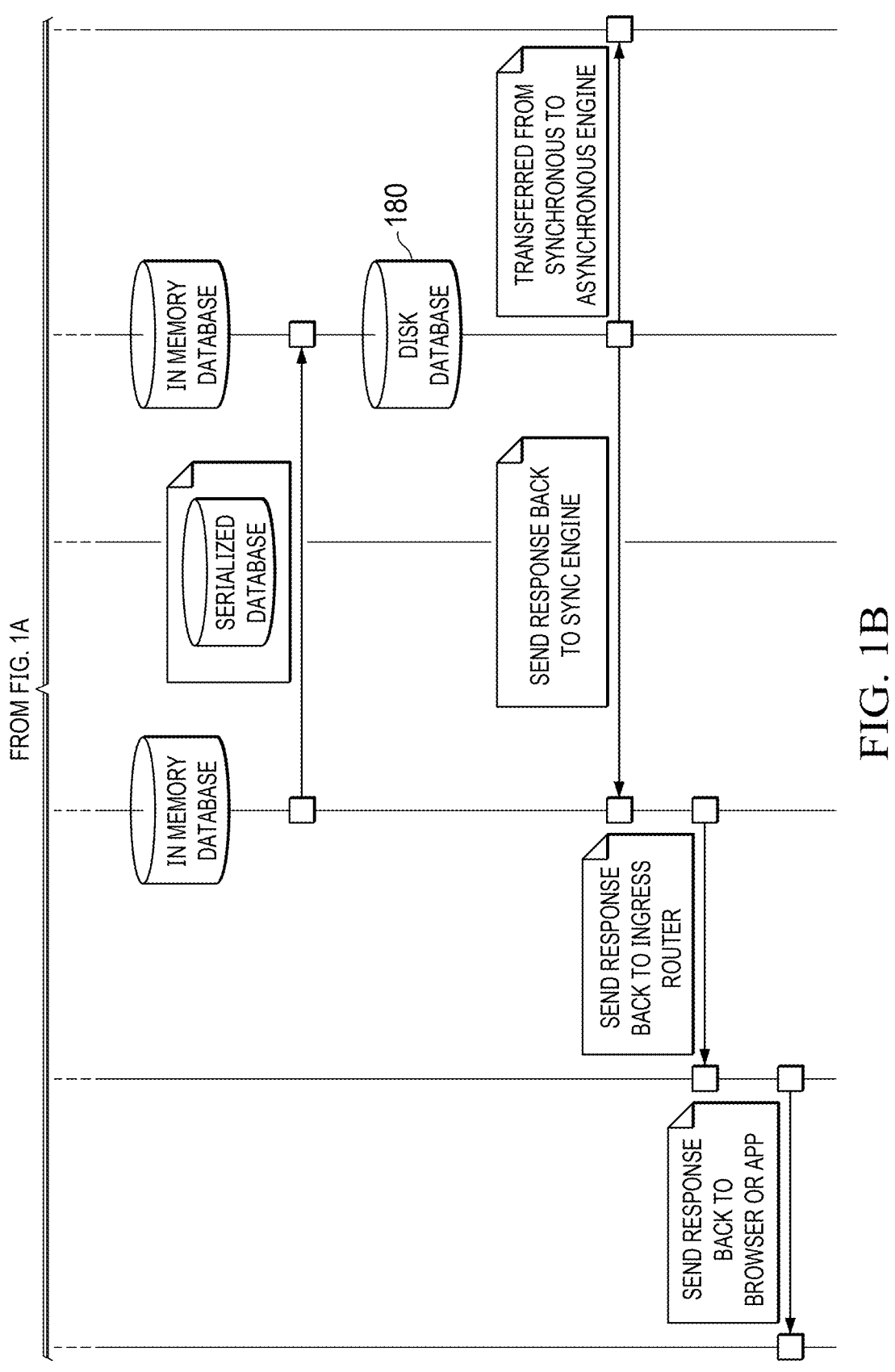

FIGS. 1A-1B depict an example of synchronous processing of a customer flow by an orchestration platform 100 that leverages an in-memory database 170 according to some embodiments disclosed herein. In this example, an origin device 110 may send a message or request to a trading partner (not shown) through an electronic information exchange platform. As a non-limiting example, the trading partner can be a vendor of a software product and the message or request may relate to getting a license for the software product. The electronic information exchange platform may leverage the orchestration platform 100 to orchestrate synchronous processing of such incoming requests. The origin device 110 can be associated with an actor or application (e.g., a user or application authorized by a customer of the electronic information exchange platform to send requests from the origin device 110). In this example, the request is received by an ingress router 120. The ingress router 120 can be part of the orchestration platform 100 or the electronic information exchange platform. In one embodiment, the orchestration platform 100 can be part of the electronic information exchange platform.

The orchestration platform 100 may have a plurality of synchronous orchestration engines. The incoming request may contain data, referred to herein as customer metadata, specific to the actor, the application, or the origin device 110. The ingress router 120 may parse the request to obtain the customer metadata and route the request to an appropriate synchronous orchestration engine 130 based on the customer metadata.

Once the request is received, the synchronous orchestration engine 130 may create an in-memory database 170 based on the customer metadata associated with the request. As alluded to above, the in-memory database 170 is created on a per-transaction basis for synchronous processing of a customer flow corresponding to the incoming request and is not kept in memory once processing of the customer flow is complete.

In the example of FIGS. 1A-1B, the synchronous orchestration engine 130 works with a synchronous orchestration service 140 to traverse a graph or tree structure with nodes that represent steps and actions involved in the customer flow. The synchronous orchestration engine 130 and the synchronous orchestration service 140 may both operate in the same computing environment (e.g., hosted in a cloud) and communicate with each other over the network. Although the synchronous orchestration engine 130 and the synchronous orchestration service 140 are implemented as different orchestration components of the orchestration platform 100 in the example of FIGS. 1A-1B, in some embodiments, the synchronous orchestration engine 130 and the synchronous orchestration service 140 can be implemented as a single orchestration component.

In operation, the synchronous orchestration engine 130 may serialize the in-memory database 170 thus created and store the serialized in-memory database 170 in memory. Here, serialization refers to the process of translating a data structure or object state into a format that can be stored or transmitted (e.g., a series of bytes) and then reconstructed later, for instance, in a different computing environment. Thus, the serialized in-memory database 170 is stored as a series of bytes in memory. Deserialization is the opposite operation in which a data structure is extracted from a series of bytes. Serialization and deserialization are known to those skilled in the art and thus are not further described herein.

To update the in-memory database 170, the synchronous orchestration engine 130 may communicate (e.g., over a network) the serialized in-memory database 170 to the synchronous orchestration service 140. The synchronous orchestration service 140 is operable to deserialize the in-memory database 170 to extract a data structure and perform a database operation on the data structure to produce an updated in-memory database. The synchronous orchestration service 140 serializes the updated in-memory database and communicates the updated in-memory database back to the synchronous orchestration engine 130.

The back-and-forth serialization and deserialization operations performed by the synchronous orchestration engine 130 and the synchronous orchestration service 140 may take place multiple times to update the in-memory database, depending upon the number of database operations needed to process the customer flow. As those skilled in the art can appreciate, the number of database operations may vary from customer flow to customer flow and is up to the complexity, and hence the configuration, of each individual flow. For instance, obtaining a software license through guaranteed processing may involve more database operations than sending a press release through non-guaranteed processing.

Once all the database operations have been performed (i.e., traversal of the graph or tree structure corresponding to the customer flow is complete), the synchronous orchestration engine 130 does not keep the updated in-memory database 170 in memory. Rather, the synchronous orchestration engine 130 communicates the updated in-memory database 170 to a return to caller service 150. In turn, the return to caller service 150 is operable to deserialize the updated in-memory database 170 to extract a corresponding data structure from a series of bytes that represent the updated in-memory database 170 and extract data from the data structure. At this point, the updated in-memory database 170 is discarded and no longer exists in serialized or deserialized form.

The data thus extracted from the updated in-memory database 170 is stored in a disk-based database 180, which can be accessible by an asynchronous orchestration engine 160. The return to caller service 150 returns a response to the synchronous orchestration engine 130 which, in turn, sends the response to the ingress router 120 to service the request from the origin device 110. At this point, the data stored in the disk-based database 180 can be asynchronously processed by the asynchronous orchestration engine 160, independent of the request from the origin device 110.

Figure 2:
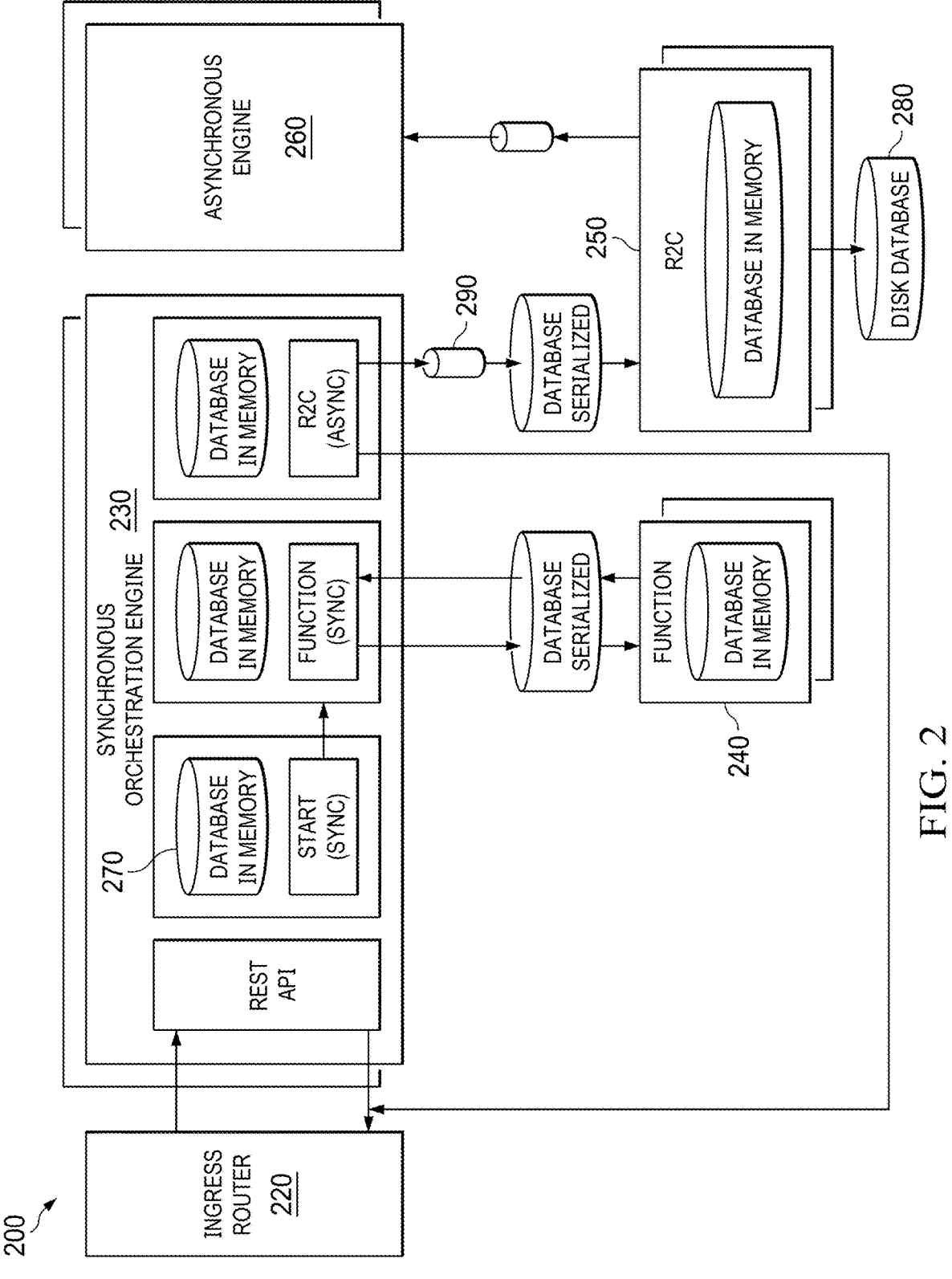
FIG. 2 depicts a diagrammatic representation of an orchestration platform with an ingress router, a synchronous orchestration engine, and an asynchronous orchestration engine according to some embodiments disclosed herein.

FIG. 2 depicts a diagrammatic representation of a non-limiting example of an orchestration platform 200 with an ingress router 220, synchronous orchestration engines 230, asynchronous orchestration engines 260, in-memory databases 270, and a disk-based database 280 according to some embodiments disclosed herein. The ingress router 220, synchronous orchestration engines 230, asynchronous orchestration engines 260, in-memory databases 270, and disk-based database 280 may operate similar to the ingress router 120, synchronous orchestration engine 130, asynchronous orchestration engine 160, in-memory database 170, and disk-based database 180 described above with reference to FIGS. 1A-1B. Likewise, synchronous processing functions 240 and return to call (R2C) services 250 may operate similar to the synchronous orchestration service 140 and the return to call service 150 described above with reference to FIGS. 1A-1B, respectively.

For instance, the ingress router 220 is operable to determine, based on customer metadata (e.g., a customer name, a software product name, a part number, a customer identifier, an account number, etc.) contained in a request from an origin device (not shown), whether to send the request to one of the asynchronous orchestration engines 260 or one of the synchronous orchestration engines 230 and, if so, which one. The ingress router 220 can be implemented on the premises of an entity to service requests from origin devices associated with the entity. Alternatively, the ingress router 220 can be hosted in a cloud. Cloud computing is known to those skilled in the art and thus is not further described herein.

Once the request is routed to an appropriate synchronous orchestration engine, the synchronous orchestration engine traverses a graph or tree structure that corresponds to a customer flow for processing the request. Each node in the graph or tree structure represents a step in the customer flow and a corresponding action that needs to be taken (e.g., performing a decryption, performing a decompression, obtaining a software license, calling a return to call service, and so on). The R2C service is a guaranteed service. For faster response time where guarantees are not necessary, reactive streams could be used.

As illustrated in FIG. 2, at any given time, the orchestration platform 200 may operate multiple synchronous orchestration engines 230, multiple asynchronous orchestration engines 260, and multiple in-memory databases 270. Each of the multiple in-memory databases 270 is created by one of the multiple synchronous orchestration engines 230 on a per-transaction basis (i.e., the multiple in-memory databases 270 are on the multiple synchronous orchestration engines 230).

Through a designated in-memory database, each customer flow gets its own in-memory view for reading and saving state. In this way, the in-memory database can simulate a disk-based database without the expensive database bottleneck that is usually created by excessive database accesses which, in turn, are usually associated with complex orchestration operations.

Conventionally, using a database for online transaction processing does not involve serialization. Generally, to use a database for online transaction processing of guaranteed transactions (e.g., for tracking/auditing purposes), an orchestration platform would communicate with a database management system which manages the database. This database is typically stored on a disk or some kind of non-volatile memory so that data is persisted even after power is removed. A performance issue here relates to the latency involved in accessing data stored in such a disk-based database.

In this disclosure, latency refers to the total amount of time that it will take for a database to receive a request, process the underlying transaction, and return an appropriate response. The actual amount of latency of a particular database will depend on many factors, for instance, where the requests come from, the type of database operations involved, etc. Created on a per-transaction basis, the in-memory databases 270 are much smaller than a disk-based database. With the in-memory databases 270, latency usually involved in synchronous processing of guaranteed transactions can be greatly reduced.

For example, in some embodiments, the synchronous orchestration engines 230 and the asynchronous orchestration engines 260 can be implemented using Kubernetes, also known as K8s. K8s and K8s pods are known to those skilled in the art and thus are not further described herein. In the non-limiting example of FIG. 2, all K8s pods for the synchronous orchestration engines 230 handle synchronous execution and no database interaction with the disk-based database 280; whereas, all K8s pods for the asynchronous orchestration engines 260 handle asynchronous execution and interact with the disk-based database 280. In load testing, the example orchestration platform 200 shown in FIG. 2 can handle about 20,000 requests per minute and a few thousands guaranteed transactions per minute, using the in-memory databases 270 and queues 290 for guaranteed transaction processing.

Figure 3:
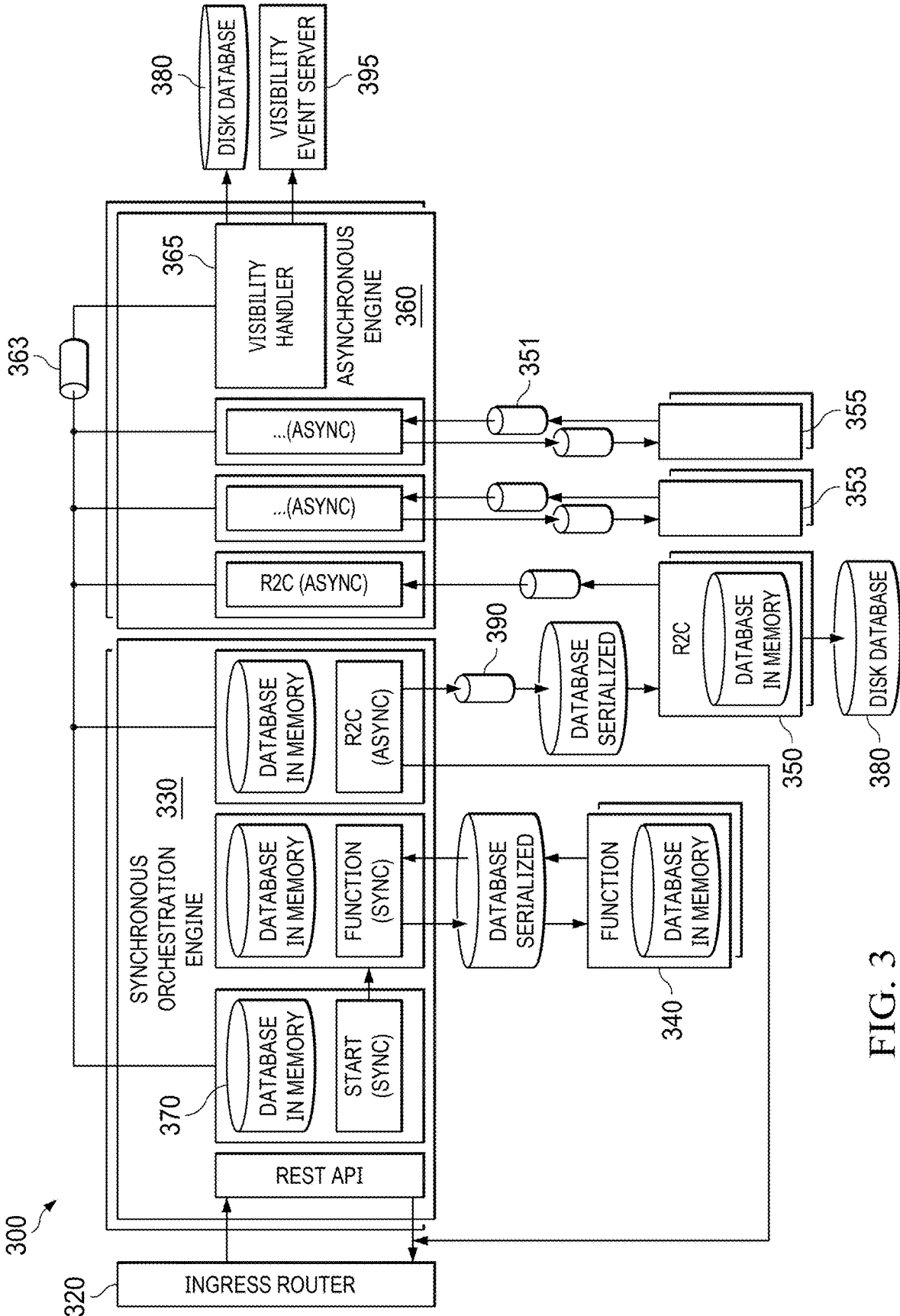
FIG. 3 depicts a diagrammatic representation of an orchestration platform with various components according to some embodiments disclosed herein.

FIG. 3 depicts a diagrammatic representation of an orchestration platform 300 with an ingress router 320, synchronous orchestration engines 330, asynchronous orchestration engines 360, in-memory databases 370, and a disk-based database 380 according to some embodiments disclosed herein. The ingress router 320, synchronous orchestration engines 330, asynchronous orchestration engines 360, in-memory databases 370, and disk-based database 380 may operate similar to the ingress routers 120, 220, synchronous orchestration engines 130, 230, asynchronous orchestration engines 160, 260, in-memory databases 170, 270, and disk-based databases 180, 280 described above with reference to FIGS. 1 and 2, respectively. Likewise, synchronous processing functions 340 and R2C services 350 may operate similar to the synchronous orchestration services 140, 240 and the return to call services 150, 250 described above with reference to FIGS. 1 and 2, respectively. In some embodiments, there can be hundreds of engines running on the orchestration platform 300.

As a non-limiting example, an actor may want to purchase a software product and send a request to a seller through an electronic information exchange platform. The request is routed to the ingress router 320 of the orchestration platform 300 which orchestrates processing of such a request for the electronic information exchange platform.

In some embodiments, the ingress router 320 may route the request to one of the synchronous orchestration engines 330 based on a customer name associated with the actor, a product name associated with the software product, or something relates to the transaction being processed. In response to the request, the synchronous orchestration engine 330 creates an in-memory database 370 and serializes the in-memory database onto the wire to one or more synchronous processing functions 340 (e.g., a synchronous orchestration service). In turn, the synchronous processing functions 340 deserialize the in-memory database, perform the necessary actions (e.g., acquiring a license of a requested software product), and update the in-memory database with metadata describing the processing details. The synchronous processing functions 340 then serialize the updated in-memory database and send the updated in-memory database back to the synchronous orchestration engine 330.

In the example of FIG. 3, the synchronous orchestration engine 330 can also communicate the in-memory database to K8s pods that implement the asynchronous orchestration engines 360, which work in concert with asynchronous orchestration functions 350, 353, 355. This can be done by serializing the in-memory database and communicating the serialized in-memory database over a network to one or more asynchronous processing functions (e.g., a R2C service 350). In communicating the serialized in-memory database over the network, a guaranteed queue 390 may be used. That is, the synchronous orchestration engine 330 may place the serialized in-memory database in the guaranteed queue 390 and, in turn, the R2C service 350 may obtain the serialized in-memory database from the guaranteed queue 390.

The R2C service 350 may deserialize the in-memory database thus obtained to extract a data structure from the in-memory database. The R2C service 350 may then extract data from the data structure and store the data in a disk-based database 380. The R2C service 350 can be a guaranteed service that is part of the asynchronous orchestration engines 360.

As illustrated in FIG. 3, the disk-based database 380 may also be accessible by the asynchronous orchestration engines 360. For non-guaranteed processing, queues 351 can be used.

In some embodiments, an asynchronous orchestration engine 360 may further include a visibility handler 365 for handling visibility events such as incident calls. In a load testing, the orchestration platform can handle about 20 K requests a minute with a very low number of incidents. With guaranteed processing, there can be a few thousands of requests per minute. For visibility, auditing is needed for reviewing incident calls. The visibility handler 365 may log various kinds of visibility events and communicate this information to components of the synchronous orchestration engines 330 and the asynchronous orchestration engine 360 (e.g., via a visibility queue 363). With the ability to log and audit visibility events, guaranteed processing by the orchestration platform 300 can be further enhanced.

FIG. 4 is a flow chart that illustrates an example of synchronous processing that leverages an in-memory database according to some embodiments disclosed herein. In some embodiments, a method 400 may include receiving a request from an origin device associated with an actor (e.g., an authorized user of a customer), an application, or a service (401). The request can contain data specific to the origin device. In some embodiments, the request can be received by an ingress router and routed to a synchronous orchestration engine based on data (e.g., customer metadata) contained in the request (403). In response to the request from the origin device, the synchronous orchestration engine may create an in-memory database using data specific to the origin device (405).

The request initiates a customer flow through an electronic information exchange platform. The in-memory database is created specifically for processing the customer flow. The customer flow may have a predetermined set of steps, each corresponding to an action. A service could be called to perform the action. The number and kinds of services thus called may vary from flow to flow. For example, the customer flows for sending a purchase order to a trading partner and sending an invoice to the trading partner may involve different numbers and/or kinds of services.

The in-memory database is serialized and stored in memory (407). Serialization saves the state of the in-memory database so that the in-memory database can be reconstructed later.

In embodiments where a synchronous orchestration service is implemented separately from the synchronous orchestration engine, the in-memory database is communicated to the synchronous orchestration service. As alluded to above, in some embodiments, the synchronous orchestration service and the synchronous orchestration engine can be implemented as a single orchestration component. Either way, a serialized in-memory database can be deserialized (by the synchronous orchestration engine or the synchronous orchestration service) to reconstruct the in-memory database (409).

At this time, one or more database operations can be performed on the in-memory database (411). Examples database operations may include inserting a row, editing a row, deleting a row, etc. As described above, the underlying orchestration platform may rely on these database operations to keep track of steps and actions performed through a particular customer flow.

In some embodiments, the in-memory database thus updated is serialized before being sent back to the synchronous orchestration engine. With all necessary actions having been taken, the synchronous orchestration engine calls a return to caller service which deserializes the in-memory database. The return to caller service may send a response back to the synchronous orchestration engine, to the ingress router, then back to the origin device and/or it may send data from the in-memory database to the slower, more guaranteed asynchronous orchestration engine (413). The data is stored in a disk-based database maintained by the asynchronous orchestration engine. At this point, the in-memory database no longer exists.

Figure 5:
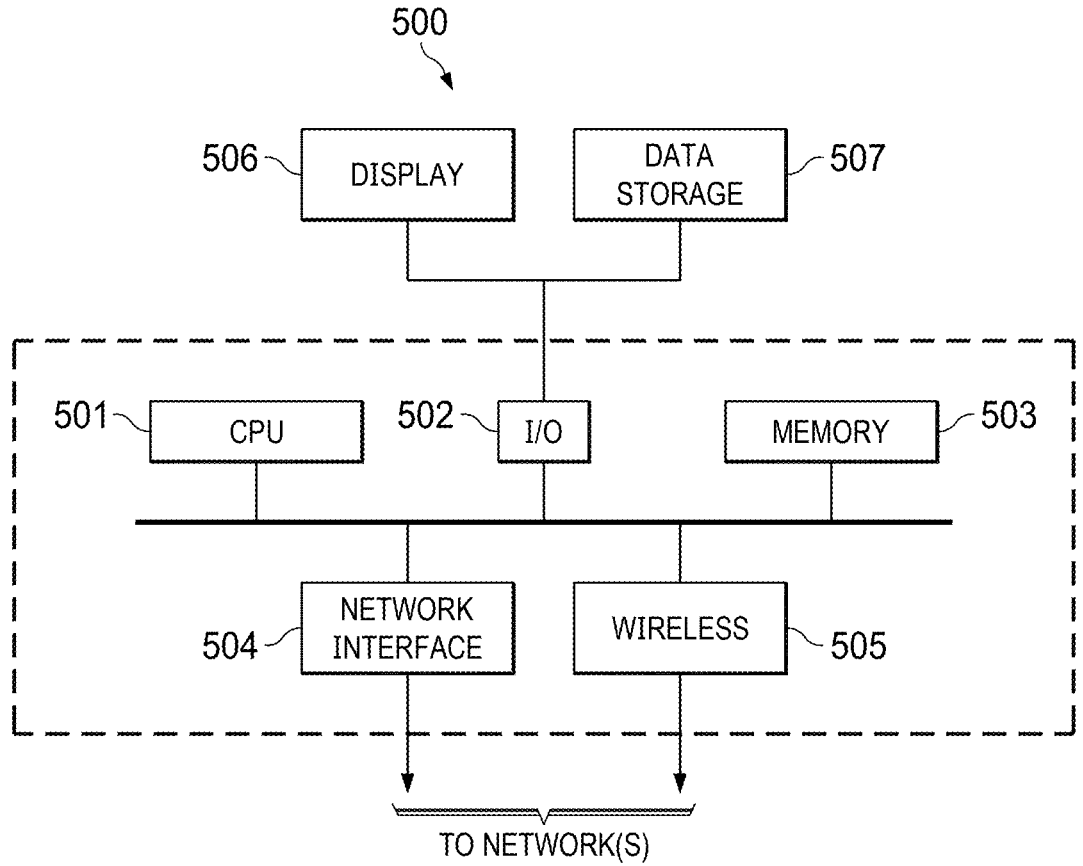
FIG. 5 depicts a diagrammatic representation of a data processing system for implementing an embodiment disclosed herein.

FIG. 5 depicts a diagrammatic representation of a data processing system for implementing an embodiment disclosed herein. As shown in FIG. 5, data processing system 500 may include one or more central processing units (CPU) or processors 501 coupled to one or more user input/output (I/O) devices 502 and memory devices 503. Examples of I/O devices 502 may include, but are not limited to, keyboards, displays, monitors, touch screens, printers, electronic pointing devices such as mice, trackballs, styluses, touch pads, or the like. Examples of memory devices 503 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 500 can be coupled to display 506, information device 505 and various peripheral devices (not shown), such as printers, plotters, speakers, etc. through I/O devices 502. Data processing system 500 may also be coupled to other computers or devices through network interface 504, wireless transceiver 505, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, particularly DSL. Other software/hardware/network architectures may be used, including programming languages such as C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any [,] hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method of performing guaranteed synchronous processing, the method comprising:

receiving, at an orchestration platform, a request from an origin device;

creating an in-memory database per the received request for guaranteed synchronous processing of the request from the origin device, the creating performed by a synchronous orchestration engine executing on a server machine of the orchestration platform;

serializing and storing, by the synchronous orchestration engine, the in-memory database in memory of the server machine;

communicating, by the synchronous orchestration engine, the in-memory database to a synchronous orchestration service, wherein the synchronous orchestration service, in synchronous with the request from the origin device, deserializes the in-memory database, performs a database operation on the in-memory database to produce an updated in-memory database, serializes the updated in-memory database, and communicates the updated in-memory database to the synchronous orchestration engine;

receiving, by the synchronous orchestration engine from the synchronous orchestration service, the updated in-memory database; and communicating, by the synchronous orchestration engine, the updated in-memory database to a return to caller service, wherein the return to caller service is operable to deserialize the updated in-memory database, extract data from the updated in-memory database, perform guaranteed synchronous processing of the request from the origin device by storing the data extracted from the updated in-memory database in a disk-based database, and return a response to the synchronous orchestration engine for responding to the request from the origin device in synchronous with the request from the origin device, and wherein the updated in-memory database is not returned to the synchronous orchestration engine or kept in memory.

2. The method according to claim 1, wherein the return to caller service is further operable to send the data to an asynchronous orchestration engine.

3. The method according to claim 1, wherein the request contains data specific to the origin device, an actor associated with the origin device, or an application running on the origin device.

4. The method according to claim 3, wherein the in-memory database is created using the data specific to the origin device, the actor associated with the origin device, or the application running on the origin device.

5. The method according to claim 1, wherein the synchronous orchestration service is a part of the synchronous orchestration engine, wherein the in-memory database is localized to the synchronous orchestration engine, and wherein the synchronous orchestration engine is a part of an orchestration component of an electronic information exchange platform.

6. The method according to claim 1, wherein the request is received from the origin device by an ingress router and routed to the synchronous orchestration engine by the ingress router based on customer metadata contained in the request.

7. The method according to claim 1, wherein the in-memory database is one of a plurality of in-memory databases, wherein the synchronous orchestration engine is one of a plurality of synchronous orchestration engines, and wherein each of the plurality of in-memory databases is created by one of the plurality of synchronous orchestration engines on a per-transaction basis.

8. A system for performing guaranteed synchronous processing, the system comprising:

a processor;

a non-transitory computer-readable medium; and instructions stored on the non-transitory computer-readable medium and translatable by the processor for:

receiving, at an orchestration platform, a request from an origin device;

creating an in-memory database per the received request for guaranteed synchronous processing of the request from the origin device;

serializing and storing the in-memory database in memory of the system;

communicating the in-memory database to a synchronous orchestration service, wherein the synchronous orchestration service, in synchronous with the request from the origin device, deserializes the in-memory database, performs a database operation on the in-memory database to produce an updated in-memory database, and serializes the updated in-memory database;

receiving, from the synchronous orchestration service, the updated in-memory database; and communicating the updated in-memory database to a return to caller service, wherein the return to caller service is operable to deserialize the updated in-memory database, extract data from the updated in-memory database, perform guaranteed synchronous processing of the request from the origin device by storing the data extracted from the updated in-memory database in a disk-based database, and return a response for responding to the request from the origin device in synchronous with the request from the origin device, and wherein the updated in-memory database is not returned to an synchronous orchestration engine of the orchestration platform or kept in memory.

9. The system of claim 8, wherein the return to caller service is further operable to send the data to an asynchronous orchestration engine.

10. The system of claim 8, wherein the request contains data specific to the origin device, an actor associated with the origin device, or an application running on the origin device.

11. The system of claim 10, wherein the in-memory database is created using the data specific to the origin device, the actor associated with the origin device, or the application running on the origin device.

12. The system of claim 8, wherein the synchronous orchestration service is a part of an orchestration component of an electronic information exchange platform and wherein the in-memory database is localized to the orchestration component.

13. The system of claim 8, wherein the request is received from the origin device by an ingress router and routed to the synchronous orchestration engine by the ingress router based on customer metadata contained in the request, and wherein the in-memory database is localized to the synchronous orchestration engine.

14. The system of claim 13, wherein the in-memory database is one of a plurality of in-memory databases, wherein the synchronous orchestration engine is one of a plurality of synchronous orchestration engines, and wherein each of the plurality of in-memory databases is localized to one of the plurality of synchronous orchestration engines.

15. A computer program product for performing guaranteed synchronous processing, the computer program product comprising a non-transitory computer-readable medium storing instructions translatable by a processor of a computer system for:

receiving, at an orchestration platform, a request from an origin device;

creating an in-memory database per the received request for guaranteed synchronous processing of the request from the origin device;

serializing and storing the in-memory database in memory of the computer system;

communicating the in-memory database to a synchronous orchestration service, wherein the synchronous orchestration service, in synchronous with the request from the origin device, deserializes the in-memory database, performs a database operation on the in-memory database to produce an updated in-memory database, and serializes the updated in-memory database;

receiving, from the synchronous orchestration service, the updated in-memory database; and communicating the updated in-memory database to a return to caller service, wherein the return to caller service is operable to deserialize the updated in-memory database, extract data from the updated in-memory database, perform guaranteed synchronous processing of the request from the origin device by storing the data extracted from the updated in-memory database in a disk-based database, and return a response for responding to the request from the origin device in synchronous with the request from the origin device, and wherein the updated in-memory database is not returned to an synchronous orchestration engine of the orchestration platform or kept in memory.

16. The computer program product of claim 15, wherein the return to caller service is further operable to send the data to an asynchronous orchestration engine.

17. The computer program product of claim 15, wherein the request contains data specific to the origin device, an actor associated with the origin device, or an application running on the origin device and wherein the in-memory database is created using the data specific to the origin device, the actor associated with the origin device, or the application running on the origin device.

18. The computer program product of claim 15, wherein the synchronous orchestration service is a part of an orchestration component of an electronic information exchange platform and wherein the in-memory database is localized to the orchestration component.

19. The computer program product of claim 15, wherein the request is received from the origin device by an ingress router and routed to the synchronous orchestration engine by the ingress router based on customer metadata contained in the request, and wherein the in-memory database is localized to the synchronous orchestration engine.

20. The computer program product of claim 19, wherein the in-memory database is one of a plurality of in-memory databases, wherein the synchronous orchestration engine is one of a plurality of synchronous orchestration engines, and wherein each of the plurality of in-memory databases is localized to one of the plurality of synchronous orchestration engines.

\* \* \* \* \*